United States Patent [19]
Guziak

[11] Patent Number: 5,197,334
[45] Date of Patent: Mar. 30, 1993

[54] PROGRAMMABLE COMPENSATION OF BRIDGE CIRCUIT THERMAL RESPONSE

[75] Inventor: Robert A. Guziak, Thousand Oaks, Calif.

[73] Assignee: Schlumberger Industries, Inc., Norcross, Ga.

[21] Appl. No.: 710,215

[22] Filed: Jun. 4, 1991

[51] Int. Cl.⁵ .................. G01L 9/04; G01L 19/04
[52] U.S. Cl. .................... 73/708; 73/766; 73/862.623; 73/862.628; 323/367; 324/725; 364/571.03
[58] Field of Search ............. 73/708, 766, 720, 721, 73/726, 727, 754, DIG. 4, 862.48, 862.65, 862.474, 862.623, 862.628; 323/367, 365, 366, 1 R; 364/571.03, 508, 509, 558; 324/725

[56] References Cited

U.S. PATENT DOCUMENTS

| | | | |
|---|---|---|---|
| T943,003 | 2/1976 | Schorn et al. | 73/362 AR |
| 3,646,435 | 2/1972 | Rozenson | 324/725 |
| 3,842,674 | 10/1974 | Wilbur et al. | 73/362 AR |
| 3,882,725 | 5/1975 | Rao et al. | 73/342 |
| 4,209,837 | 6/1980 | Brown | 364/117 |
| 4,232,269 | 11/1980 | Willoner | 330/85 |
| 4,437,164 | 3/1984 | Branch, III | 73/766 |
| 4,462,003 | 7/1984 | Takamatsu | 330/254 |
| 4,478,527 | 10/1984 | Mergner | 374/172 |
| 4,481,596 | 11/1984 | Townzen | 364/571 |
| 4,484,050 | 11/1984 | Horinouchi et al. | 219/10.55 B |
| 4,523,161 | 6/1985 | Miles | 333/81 R |
| 4,628,316 | 12/1986 | Momin | 340/870.38 |
| 4,667,143 | 5/1987 | Cooper et al. | 320/22 |
| 4,713,812 | 12/1987 | Arnold et al. | 371/10 |
| 4,765,188 | 8/1988 | Krechmery et al. | 73/706 |
| 4,858,615 | 8/1989 | Meinema | 73/1 R |

*Primary Examiner*—Donald O. Woodiel
*Attorney, Agent, or Firm*—Townsend and Townsend

[57] ABSTRACT

The present invention provides compensation for temperature in a transducer by connecting the adjustment resistors to the transducer itself to provide a correct transducer output. A number of switches are used to couple the adjustment resistors to the transducer circuit. An individual resistor may be coupled in parallel or in series with a transducer resistance. The control input for the switches are each coupled to a separate bit output of a multiple bit memory. The memory is programmed to control the duty cycle of the switches when addressed.

5 Claims, 1 Drawing Sheet und 5,197,334

PROGRAMMABLE COMPENSATION OF BRIDGE CIRCUIT THERMAL RESPONSE

BACKGROUND OF THE INVENTION

The present invention relates to circuits for adjusting the thermal response of a bridge circuit.

One type of transducer changes its resistance in response to external stimuli. For instance, a pressure transducer will vary its resistance in proportion to the amount of pressure exerted on the transducer. One type of pressure transducer has four legs forming a bridge, with two of the legs increasing in resistance with pressure and the other two legs decreasing in resistance with pressure. The value of the resistance will vary with temperature, and accordingly a temperature-variable resistor (thermistor) is typically added to the circuit to offset the variation in resistance of the bridge with temperature.

After the addition of the thermistor, minor changes to the resistance of the bridge are still often necessary. This is typically done using trimming resistors. The trimming resistors are coupled to the bridge circuit and are typically a resistive area film which is cut with a laser to decrease its area and thus trim the resistance value.

Two types of changes with temperature are typically compensated for. One such change is referred to as a change in "span". For example, in a differential pressure transducer, the range (span) of the output voltage (minimum and maximum voltage) will vary with temperature. Thus, the span will require compensation. The other characteristic which varies is referred to as the "zero" value, which is the output voltage at a reference temperature and pressure. Other methods for performing zero and span compensation involve modifying the output signal from the transducer according to an algorithm to compensate for the temperature variations. The following patents discuss typical methods and circuits used.

Mergner U.S. Pat. No. 4,478,527 uses temperature variable resistors to create a temperature slope, a span slope and a DC offset. The resultant signals are then summed.

Brown U.S. Pat. No. 4,209,837 shows a switched current source.

Cooper U.S. Pat. No. 4,667,143 discloses a closed loop sensor which varies a voltage as a function of temperature using a switched mode integrated circuit.

Schorn Protective Disclosure No. T943003 provides a method of selecting a predetermined combination of fixed resistors and thermistors.

Rao U.S. Pat. No. 3,882,725 shows a circuit for compensating a single variable leg bridge for temperature and initial zero.

Wilbur U.S. Pat. No. 3,842,674 shows a variable potentiometer for controlling zero and span.

Horinouchi U.S. Pat. No. 4,484,050 increases the accuracy of a thermistor by straightening the thermistor curve and digitally sets a reference voltage.

Momin U.S. Pat. No. 4,628,316 discloses a method for performing an error calculation for temperature variations.

Takamatsu U.S. Pat. No. 4,462,003 discloses a method of selecting a set of fixed resistors to program gain.

Miles U.S. Pat. No. 4,523,161 discusses a method for selecting a set of fixed resistors to program attenuation.

Townzen U.S. Pat. No. 4,481,596 shows a method for summing two curves to cancel the errors.

Wiloner U.S. Pat. No. 4,232,269 uses switched resistors to program a filter response.

SUMMARY OF THE INVENTION

The present invention provides compensation for temperature in a transducer by connecting the adjustment resistors to the transducer itself to provide a correct transducer output. A number of switches are used to couple the adjustment resistors to the transducer circuit. An individual resistor may be coupled in parallel or in series with a transducer resistance. The control input for the switches are each coupled to a separate, bit output of a multiple bit memory. The memory is programmed to control the duty cycle of the switches when addressed.

The memory is programmed in an unconventional manner, using the column outputs. The duty cycle for a particular switch is determined by the change in a bit position of a normal word in memory from one word to the next. This is in contrast to the normal use of a memory in which the output word is decoded to provide single control signal.

In the preferred embodiment, the memory is a PROM which can be programmed after the characteristics of the transducer are measured. The PROM is cycled by a counter under control of a clock. The bridge circuit has four legs, two of which increase in resistance with pressure and two of which decrease in resistance with pressure. For each pair of legs, one has an adjustment resistor switched in parallel and the other has an adjustment resistor switched in series to allow for compensation in either direction. A source resistor coupled to the top of the bridge has a thermistor coupled in parallel and can itself be switched in and out of the circuit. A parallel resistance is coupled across the bridge from top to bottom and is also switched in and out of the circuit.

The PROM of the present invention is programmed after an appropriate thermistor is chosen and inserted into the circuit. The circuit is subjected to several different temperatures with measurements being made. The results are used to compute the desired duty cycle for the adjustment resistor according to an appropriate algorithm.

The present invention thus provides a simplified and inexpensive method and apparatus for correcting for temperature variations at the transducer source.

For a fuller understanding of the nature and advantages of the invention, reference should be made to the ensuing detailed description taken in conjunction with the accompanying drawing.

DETAILED DESCRIPTION OF THE PREFERRED EMBODIMENT

Figure 1:
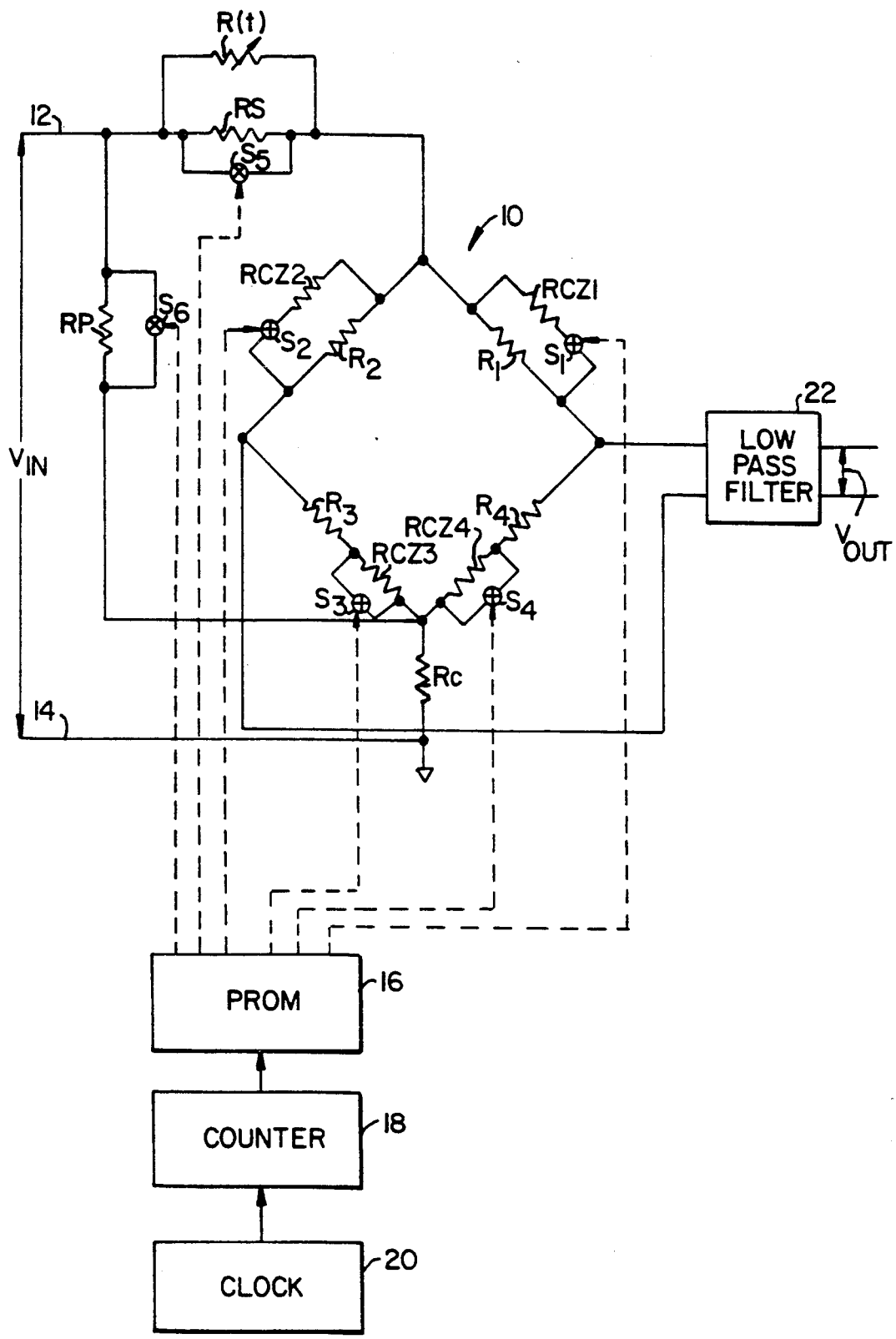
FIG. 1 is a diagram of a temperature compensation circuit according to the present invention.

FIG. 1 shows a preferred embodiment of the present invention. A bridge circuit 10 includes resistors R1, R2, R3 and R4. An input to the bridge is provided by an input voltage (Vin) across terminals 12 and 14. A source resistor Rs is coupled between the input and the top of the bridge. A parallel resistor Rp is coupled across the bridge from top to bottom. A current resistor Rc is coupled to the bottom of the bridge. A thermistor R(t) is coupled across resistor Rs.

In the bridge circuit, resistors Rcz1 and Rcz2 are coupled in parallel with resistors R1 and R2 by switches S1 and S2, respectively. At the bottom of the bridge, resistors Rcz3 and Rcz4 are coupled in series with resistors R3 and R4, respectively, by switches S3 and S4. Additional switches S5 and S6 can remove resistors Rs and Rc from the circuit as well. By varying the duty cycle of the control signal supplied to these switches, the average resistance of any of the controlled resistors can be varied. The switches are controlled by different bit outputs of a programmable read only memory (PROM) 16. PROM 16 is controlled by a counter 18, which in turn is controlled by a clock 20. With the bit output alternating between digital 1 and digital 0, the switch will turn on and off, providing either the full resistance value or no resistance to the circuit. By varying the duty cycle, an average resistance value between the full resistor value and zero can be produced. A low pass filter 22 coupled to the output of the bridge provides a smooth average value of the total bridge output. By using an 8K(8192) PROM, a resistance resolution of 1/8192 can be achieved. For example, if bit 0 is set to 1 in all words the resistor value is (8192/8192) R=R. If bit 0 is set to 1 in only one word, the resistor value is (1/8192) R=R/8192. Values in-between can also be obtained, such as by setting bit 0 to 1 in words 1 and 2, giving (2/8192) R=R/4096.

The equations used to compute the duty cycle are as follows:

$$R = R_{fixed} \cdot Duty\ Cycle$$

or $$Duty\ Cycle = R/R_{fixed} = t_{on}/(t_{on} + t_{off})$$

One cycle is defined as one complete period of a waveform. The minimum cycle is 2-bit times. The maximum cycle is 8192-bit times for an 8K byte.

The Duty Cycle equations can be rewritten as:

$$D.C. = t_{on}/(t_{on} + t_{off}) = \frac{\#bits\ on \times time/bit}{\#bits\ on \times time/bit + \#bits\ off \times time/bit}$$

$$= \frac{\#bits\ on}{\#bits\ on + \#bits\ off}$$

The bit time must meet two requirements:
1) The bit time must be less than half the signal rise time;
2) The maximum bit frequency is half the bandwidth of the output filter.

In an alternate embodiment, switches S3-S6 would have an additional resistance in series. As shown in FIG. 1, these switches either eliminate the adjustment resistor from the circuit or insert its full value. By providing a different resistance value in series with a switch, turning the switch on and off alternates between the adjustment resistor value (Rcz3, Rcz4, Rs or Rp) and the value of the resistor in series. This provides a smaller range but more precision.

Resistors Rs and Rp control the span of the transistors, while the Rcz resistors control the zero point of the transducers. The switches are preferably MOSFET transistors which have a low resistance. A low resistance is desirable to avoid the switches affecting the performance of the transistor by their own on-resistance. Alternately, the transducer circuit can be characterized with the transistors on so that their resistance can be taken into account.

As will be understood by those familiar with the art, the present invention may be embodied in other specific forms without departing from the spirit or essential characteristics thereof. For example, additional resistors and switches can be added to the circuit of FIG. 1 to improve the accuracy. Accordingly, the disclosure of the preferred embodiment of the invention is intended to be illustrative, but not limiting, of the scope of the invention which is set forth in the following claims.

What is claimed is:

1. An apparatus for adjusting the value of a combined resistance in a measurement circuit, comprising:
   a plurality of adjustment resistors coupled to said measurement circuit;
   a plurality of switching means, each coupled to one of said adjustment resistors, for varying a combined value of said plurality of adjustment resistors by disconnecting one of said adjustment resistors or by switching a second adjustment resistor into or out of parallel with said adjustment resistor;
   a memory having a multiple bit output, each of said bit outputs being coupled to a control input of one of said switching means, said memory being programmed such that each bit position in sequentially addressed words controls the duty cycle of one of said switching means to vary the effective resistance of one of said adjustment resistors; and
   means for addressing said memory.

2. The apparatus of claim 1 wherein said memory is a programmable read only memory.

3. The apparatus of claim 1 wherein said means for addressing said memory comprises a counter having its output coupled to the address inputs of said memory and a clock having its output coupled to an input of said counter.

4. The apparatus of claim 1 wherein said measurement resistors form a bridge circuit having four legs, and two of said adjustment resistors are coupled in series with two of said legs while another two of said adjustment resistors are coupled in parallel with another two of said legs.

5. A bridge circuit pressure transducer comprising:
   four pressure sensitive resistors coupled in a bridge formation with first and second opposite resistors increasing in resistance with pressure and third and fourth opposite resistors decreasing in resistance with pressure;
   a source resistor coupled between a junction of said first and fourth resistors and an input terminal;
   a parallel resistor coupled between said input terminal and a junction of said second and third resistors;
   first and fourth control resistors coupled in parallel with said first and fourth resistors;
   second and third control resistors coupled in series with said second and third resistors;
   first and fourth switching means coupled in series with said first and fourth control resistors;
   second and third switching means coupled in parallel with said second and third control resistors;
   fifth switching means coupled in parallel with said source resistors;
   sixth switching means coupled in parallel with said parallel resistor;

programmable memory having a plurality of bit outputs, each bit output being coupled to a control input of a different one of said switching means;

a counter having an output coupled to said programmable memory;

a clock having an output coupled to an input of said counter; and a low-pass filter having a first input coupled to a junction of said first and second resistors and a second input coupled to a junction of said third and fourth resistors.

* * * * *